US011993921B2

(12) United States Patent
Haughom

(10) Patent No.: US 11,993,921 B2
(45) Date of Patent: May 28, 2024

(54) CYLINDER, HYDRAULIC SYSTEM, CONSTRUCTION MACHINE AND PROCEDURE

(71) Applicant: Elmaco AS, Tonstad (NO)

(72) Inventor: Per Olav Haughom, Tonstad (NO)

(73) Assignee: Elmaco AS, Tonstad (NO)

( * ) Notice: Subject to any disclaimer, the term of this patent is extended or adjusted under 35 U.S.C. 154(b) by 16 days.

(21) Appl. No.: 17/619,689

(22) PCT Filed: Jun. 17, 2020

(86) PCT No.: PCT/NO2020/050165

§ 371 (c)(1),
(2) Date: Dec. 16, 2021

(87) PCT Pub. No.: WO2020/256564

PCT Pub. Date: Dec. 24, 2020

(65) Prior Publication Data

US 2022/0307230 A1 Sep. 29, 2022

(30) Foreign Application Priority Data

Jun. 17, 2019 (NO) .................................... 20190738

(51) Int. Cl.
*E02F 9/22* (2006.01)
*E02F 9/08* (2006.01)
(Continued)

(52) U.S. Cl.
CPC .......... *E02F 9/2271* (2013.01); *E02F 9/0883* (2013.01); *E02F 9/2203* (2013.01);
(Continued)

(58) Field of Classification Search
CPC .. F15B 15/14; F15B 15/1466; F15B 15/1428; E02F 9/2217
See application file for complete search history.

(56) References Cited

U.S. PATENT DOCUMENTS 2,761,425 A 9/1956 Bertsch et al.
4,531,451 A 7/1985 Mouton
(Continued)

FOREIGN PATENT DOCUMENTS

CN 103526787 1/2014
CN 106939910 7/2017
(Continued)

OTHER PUBLICATIONS

Norwegian Search Report for NO 20190738, dated Jan. 17, 2020.
(Continued)

*Primary Examiner* — Abiy Teka
(74) *Attorney, Agent, or Firm* — Andrus Intellectual Property Law, LLP

(57) ABSTRACT

A cylinder has a piston part, a cylinder part, and a pipe section connected to the piston or cylinder parts. A portion of the pipe section encloses a pressure compartment which receives a fluid to apply a pressure on a pressure surface so the piston part is displaced in a first stroke direction. A first return pressure compartment receives a fluid to apply a pressure on a first return pressure surface so that the piston part is displaced in a second return stroke direction. The first return pressure compartment is positioned on the outside of the pipe section, and the area of the first return pressure surface is substantially equal to the area of the return pressure surface so that a volume-neutral operation of the cylinder is provided. Also described is a hydraulic system, an excavator comprising the cylinder and a procedure for operation of the cylinder.

20 Claims, 9 Drawing Sheets

(51) Int. Cl.
*F15B 13/02* (2006.01)
*F15B 15/14* (2006.01)

(52) U.S. Cl.
CPC .......... *E02F 9/2289* (2013.01); *F15B 13/027* (2013.01); *F15B 15/1428* (2013.01); *F15B 15/1447* (2013.01)

(56) References Cited

U.S. PATENT DOCUMENTS

| | | | | |
|---|---|---|---|---|
| 5,101,556 | A | 4/1992 | Fluga | |
| 6,460,332 | B1 | 10/2002 | Maruta et al. | |
| 7,104,052 | B1 * | 9/2006 | Hindman | A01D 34/246 60/415 |
| 2007/0068754 | A1 * | 3/2007 | Furgala | F15B 1/024 188/315 |
| 2009/0287373 | A1 | 11/2009 | Vigholm et al. | |
| 2010/0018195 | A1 * | 1/2010 | Stanger | E02F 3/38 60/414 |
| 2018/0023271 | A1 | 1/2018 | Quan et al. | |
| 2018/0045228 | A1 | 2/2018 | Nussbaum et al. | |
| 2019/0277311 | A1 * | 9/2019 | Verho | E02F 9/2292 |

FOREIGN PATENT DOCUMENTS

| | | |
|---|---|---|
| CN | 108561345 | 9/2018 |
| EP | 3150861 | 4/2017 |
| GB | 1197976 | 7/1970 |
| JP | 2005344776 | 12/2005 |
| NO | 317269 | 9/2004 |
| WO | 2004113622 | 12/2004 |
| WO | 2014176256 | 10/2014 |
| WO | 2016122321 | 8/2016 |

OTHER PUBLICATIONS

International Search Report and the Written Opinion for PCT/NO2020/050165, dated Sep. 4, 2020.

Response to the Written Opinion for PCT/NO2020/050165, dated Apr. 27, 2021.

The Second Written Opinion for PCT/NO2020/050165, dated May 6, 2021.

International Preliminary Report on Patentability for PCT/NO2020/050165, dated Aug. 16, 2021.

Extended European Search Report for EP 20825899.6, dated Jun. 7, 2023.

* cited by examiner

CYLINDER, HYDRAULIC SYSTEM, CONSTRUCTION MACHINE AND PROCEDURE

CROSS-REFERENCE TO RELATED APPLICATIONS

This application is the U.S. national stage application of International Application PCT/NO2020/050165, filed Jun. 17, 2020, which international application was published on Dec. 24, 2020, as International Publication WO 2020/256564 in the English language. The International Application claims priority of Norwegian Patent Application No. 20190738, filed Jun. 17, 2019. The international application and Norwegian application are both incorporated herein by reference, in entirety.

FIELD

The invention relates to a cylinder, a hydraulic system, a construction machine and a procedure. A volume-neutral cylinder is described in various embodiments.

BACKGROUND

Today, hydraulic systems are used in building and construction machines to transmit power to working operations that are to be carried out. This can for example comprise excavators and loading machines where hydraulic cylinders are used to convert liquid pressure and liquid flow to high-power linear movements.

A hydraulic system for a construction machine comprises one or more hydraulic pumps that are typically driven by a combustion engine, and a plurality of hydraulic functions, for example cylinders and motors. Directional control valves ensure that the desired amount of oil is supplied to the different hydraulic functions. Choking and pressure drop in the valves can result in great energy loss in the form of heat, which is then typically cooled off with coolers in the oil circuit. Today's hydraulic systems are not optimised with regard to energy consumption, but this has not been addressed in the industry because access to energy from combustion engines has been cheap.

The construction industry and in particular construction machines that emit a lot of CO2 are now facing requirements to reduce emission of greenhouse gases, and stricter HSSE requirements.

One solution for reducing the emissions is to use a battery as the energy supply. Batteries are less energy dense than combustion engines. That means for example that a battery-powered construction machine will require significantly more time for energy supply than a corresponding construction machine with a combustion engine, which results in reduced operating time for a battery-powered excavator.

Another solution is to regenerate energy from the machine's hydraulic system, for example by taking advantage of the oil pressure in the cylinders of a boom on an excavator. The patent document NO317269 describes an excavator with a separate hydraulic boom cylinder arranged to produce a counterforce and an additional hydraulic pressure which can be used to reduce the power and energy needed for lifting the digging boom.

The patent document EP3150861 describes an excavator wherein the directional control valves for the boom cylinder, the stick cylinder and the bucket cylinder are replaced with a plurality of closed and independent oil circuits. Each circuit comprises a double acting cylinder, a motor, and an oil pump. Because the cylinders have different pressure volume and return volume, each oil motor is connected to an oil tank so that excess oil can be drained from the return volume when the cylinder is moved in a pressure direction, and from the tank to the return volume when the cylinder is moved in a return direction.

The patent document JP2005344776A also describes an excavator with closed hydraulic circuits for the excavator's boom cylinder, stick cylinder and bucket cylinder. Also described is a volume-neutral cylinder so that the amount of oil in each circuit can be kept constant. The volume-neutral cylinder has a through piston rod, wherein the piston rod's one free end is housed by an additional cylinder compartment, which gives the cylinder an extra build-in length corresponding to the cylinder's stroke travel.

The purpose of the invention is to remedy or to reduce at least one of the disadvantages of prior art, or at least to provide a useful alternative to prior art.

The purpose is fulfilled by the features specified in the description below and the subsequent patent claims.

SUMMARY

In a first aspect the invention relates to a cylinder comprising: a piston part; a cylinder part arranged for axial movement relative to the piston part; one or more pressure compartments arranged to receive a fluid for applying a pressure on one or more pressure surfaces for displacement of the piston part in a first stroke direction;

and one or more return pressure compartments arranged to receive a fluid for applying a pressure on one or more return pressure surfaces for displacement of the piston part in a second return stroke direction; the cylinder part and/or the piston part comprising a pipe portion which encloses the one or at least one of said pressure compartment(s) and/or pressure surface(s) in a radial internal area of the cylinder; and the cylinder part and/or the piston part further comprise the one or at least one of said return pressure compartment(s) and/or return pressure surface(s) in a radial external area of the cylinder.

In that way, fluid can in an advantageous manner utilise the return pressure compartment and/or the return pressure surfaces in the external area to contribute in full or partially to the return pressure, and for example achieve volume-neutral operation of the cylinder.

The pressure surface(s) and the return pressure surface(s) are preferably configured for volume-neutral or approximately volume-neutral operation of the cylinder.

The return pressure surface(s) preferably have in total an area size projected onto a plane perpendicular to the stroke direction which is equal to or approximately equal to the pressure surface(s)'s area size projected onto a plane perpendicular to the stroke direction. The return pressure surface(s) typically have an area size which is equal to or approximately equal to the total area size of the pressure surface(s), for example by means of pressure surfaces and return pressure surfaces standing perpendicular to the axial direction. In that way, volume-neutral behaviour can be achieved.

An effect is that in this way, an identical pressure speed and return speed can be achieved for the piston part and/or the cylinder part if the pressure volume and the return volume is supplied with an equal specified amount of oil. The cylinder can in an advantageous manner be utilised so that a specified amount of oil can displace the piston part the same distance in the pressure direction as in the return direction, regardless of whether the oil is supplied from the pressure side or the return side. An amount of oil can be supplied to pressure compartments, which can be the same amount of oil as the amount that is drained from return compartments and vice versa. Further, the cylinder can have a pushing force in the pressure direction (pressure force) which is equally as great as in the return direction (pulling force). A further effect is that the cylinder can be used in a closed oil circuit with a constant oil volume, and without the need for an additional tank and fluid supply to compensate for different pressure volumes and return volumes or a pump with variable oil volume.

In other examples, the return pressure surface(s) can have a total area size or projected total area size which is different from the total area size or projected total area size of the pressure surface(s). This can be useful in circuits that do not have to be identical, for example if strictly volume-neutral behaviour is not necessary.

The cylinder part or the piston part typically has a first end which comprises a guide for the other of the cylinder part and the piston part, and a second end which is closed for the other of the cylinder part and the piston part.

One or more return pressure compartments can be designed as annuli. The one or more return pressure surfaces can be annular.

An effect of providing one or more return pressure surfaces in the cylinder's radial external area, is that a volume-neutral cylinder can be provided without a through piston rod. Thereby the cylinder can be configured for end mounting and be connected as a replacement for a double acting cylinder without change to the build-in length, stroke or the need for a through piston rod.

End mounting can be understood as the cylinder part being connected in one end to a first body and the piston part being connected in a free end to a second body, and that the total length of the cylinder can be changed corresponding to a given stroke for the cylinder.

The total area of the return pressure surface(s) can be up to 10 percent larger or smaller than the total area of the pressure surface(s), so that the pressure force and return force of the cylinder have a maximal difference of between 0 and 10 percent. A difference of up to 10 percent can be an acceptable deviation in applications with a limited accuracy requirement. For example, in an embodiment with a 1% deviation, 1 litre of oil on the pressure side will produce a pressure stroke of 100 mm, and 1 litre of oil on the return side will produce a return stroke of 99 or 101 mm. Correspondingly, an identical total area size of return and pressure sides will produce identical pressure strokes and return strokes. The total area of the pressure surface(s) and the total area of the return pressure surface(s) can in an advantageous embodiment have a deviation of less than 1%.

A pressure pipe can in an embodiment be a part of the cylinder part. In this embodiment, the at least one pressure compartment can be positioned in a first end portion of the cylinder, and the internal structure can comprise a centred pressure surface associated with a first end of the piston part.

The pressure pipe can in an alternative embodiment be a part of the piston part. In this embodiment, the at least one pressure compartment can be positioned in a second end portion of the cylinder and can comprise a centred pressure surface in a second end of the piston part.

The at least one return pressure compartment in the radial external area of the cylinder can advantageously enclose the at least one pressure compartment. This return pressure compartment can alternatively enclose a portion of the pressure compartment, for example by the return pressure compartment extending in a radial sector about the pressure compartment, or being arranged in a compartment positioned on the outside of the cylinder part, wherein the external compartment is connected to the piston part.

The cylinder can further comprise at least one first return pressure compartment and/or at least one first return pressure surface. The cylinder can further comprise at least one second return pressure compartment and/or at least one second return pressure surface. The cylinder can further comprise a pipe section, wherein the pipe portion can be a portion of the pipe section. The pipe section can further extend about or enclose a second return pressure compartment and/or at least one second return pressure surface. The second return pressure compartment and/or the second return pressure surface are typically provided in the radial internal area of the cylinder. The pipe section can comprise at least one port arranged to provide fluid communication between the first return pressure compartment and the second return pressure compartment.

An effect of the pipe section, which in this way is provided about or encloses a second return pressure compartment and/or at least one second return pressure surface, is that the second return pressure surface can be used by fluid in towards the centre of the cylinder to contribute to the return pressure so that the outer diameter of the cylinder can be reduced.

The cylinder can further comprise a third return pressure compartment and/or at least one third return pressure surface. The third return pressure compartment and/or third return pressure surface is typically provided in the radial external area of the cylinder. The third return pressure compartment can enclose the first return pressure compartment. The external structure can comprise a cylinder pipe between the first return pressure compartment and the third return pressure compartment. The cylinder pipe can comprise at least one port arranged to provide a fluid communication between the first return pressure compartment and the third return pressure compartment. An effect of the third return pressure compartment is that pressure compartments can be positioned in the cylinder's first end portion and that the piston part can comprise a centred piston rod. The third pressure compartment can be an annulus. The third pressure surface can be annular.

The second return pressure compartment can be designed as an annulus. The second return pressure surface can be annular.

A first end of the cylinder part can comprise a first coupling element so that the cylinder can be end mounted.

The first coupling element can comprise an elongated bolt hole with a centre axis that crosses a longitudinal centre axis of the cylinder. Upon crossing of the axes, a torque moment in the coupling element can be avoided by applying an axial load to the cylinder when in use.

The first coupling element can comprise a first hydraulic port. The first hydraulic port can contribute to the cylinder being compactable, oil being suppliable to the pressure side in an easy manner, for example when the cylinder comprises one or more annuli which enclose a portion of a circular pressure compartment in an end portion of the cylinder house.

The cylinder can comprise a plurality of seals arranged to separate fluid in the pressure compartment from fluid in one or more return pressure compartments.

In a second aspect, the invention relates to a cylinder which comprises: a piston part; a cylinder part which in a first end comprises a guide for the piston part and which in an opposite, second end is closed for the piston part; one or more pressure compartments arranged to receive a fluid for applying a pressure on one or more pressure surfaces for displacement of the piston part in a first stroke direction; and one or more return pressure compartments arranged to receive a fluid for applying a pressure on one or more return pressure surfaces for displacement of the piston part in a second return stroke direction; wherein the pressure surface(s) and the return pressure surface(s) are configured for volume-neutral or approximately volume-neutral operation of the cylinder.

The cylinder can have one or more further features as described above in connection to the first aspect of the invention.

In a third aspect, the invention relates to a cylinder comprising: a piston part; a cylinder part arranged for axial movement relative to the piston part; one or more pressure compartments arranged to receive a fluid for applying a pressure on one or more pressure surfaces for displacement of the piston part in a first stroke direction; and one or more return pressure compartments arranged to receive a fluid for applying a pressure on one or more return pressure surfaces for displacement of the piston part in a second return stroke direction; a pipe section connected to the piston part or the cylinder part, wherein a portion of the pipe section encloses the one or at least one of said pressure compartments which in an axial direction is delimited by the one or at least one of said pressure surface(s); wherein the one or at least one of said return pressure compartment(s) and/or return pressure surface(s) are positioned on the outside of the pipe section.

The cylinder can have one or more further features as described above in connection to the first aspect or the second aspect of the invention.

In a fourth aspect, the invention relates to a hydraulic system comprising a hydraulic circuit comprising at least one cylinder according to the first, second or third aspect of the invention.

In advantageous embodiments, an element operated by the at least one cylinder can be moved at an identical speed in a first direction and in a second direction at a given fluid amount.

The hydraulic circuit can be closed.

A closed hydraulic circuit can herein be understood as an oil circuit with one consumer to which oil is supplied by a separate pump. The consumer can be the cylinder. By the hydraulic circuit being closed, use of directional control valves in the hydraulic circuit can be avoided, so that pressure loss and overheating can be reduced. Further, the fluid amount in a closed system can be kept constant.

The closed circuit can comprise a top-up pump and an oil tank arranged to supply top-up oil to the closed circuit.

An effect of the top-up pump and the oil tank is that any leakages of fluid through for example seals can be compensated so that the closed circuit can at all times maintain an optimal oil volume.

The top-up oil can be supplied to the circuit through at least one check valve.

An effect of the check valve is that fluid can be prevented from being led from the circuit to the top-up pump. In an advantageous embodiment, the top-up pump can be connected to the circuit on two sides of the pump so that top-up fluid can be supplied regardless of whether the fluid is being supplied to the pressure volume or the return pressure volume of the cylinder.

The cylinder can be connected to a fluid pump with a rotation direction which is switchable between a first rotation direction and a second rotation direction, wherein the first rotation direction operates the pump to supply fluid to the cylinder's pressure compartment, and the second rotation direction operates the pump to supply oil to the cylinder's return pressure compartment.

By the cylinder being supplied with oil directly from the pump as described herein, the pump can provide a fluid flow and a fluid pressure only when the cylinder's piston part is to be displaced in the pressure direction or the return direction. When the piston part is standing still, the pump will also be standing still so that no energy is being used.

The fluid pump can have a fixed volume so that the fluid flow is identical regardless of the rotation direction.

The pump can be connected to an electric motor, and the electric motor can be connected to a frequency converter arranged to change rotation direction and RPM of the electric motor and/or the pump.

By the pump being connected to an electric motor which is connected to a frequency converter, the electric motor's rotation direction and RPM can be regulated steplessly by the frequency converter and the cylinder can be operated without a directional control valve.

With stepless regulation of RPM, a flow, i.e. an oil flow and/or pressure from the hydraulic pump, can be controlled steplessly without valves with choking and without energy loss caused thereby. The electric motor can be a PM motor that can have a full starting torque without RPM and can be especially well-suited to regulate pressure and flow with small amounts and/or great precision.

With a volume-neutral cylinder, the direction and the speed of the cylinder stroke can be identical in the pressure direction and the return direction when the pump rotates at the same RPM in a first direction or second direction. This can be controlled directly by the RPM on the electric motor being controllable in both speed and direction.

The speed of the cylinder movement can be regulated with the RPM of the electric motor, wherein the RPM of the electric motor can be controlled via the frequency converter. The frequency converter can be connected to an electronic controller (PLS) and further to a handle which an operator can control to determine a desired speed and/or power of the cylinder.

If the hydraulic system comprises several cylinders according to the first aspect, one circuit can be provided for each cylinder, wherein each circuit comprises a cylinder connected to a pump and possibly an electric motor as described above. Each circuit can then be operated individually.

In an alternative embodiment, the stroke direction can be regulated with a single directional control valve.

In a fifth aspect, the invention relates to a construction machine comprising at least one cylinder according to the first, second or third aspect of the invention.

In advantageous embodiments, the cylinder can be moved in a stroke direction or in a return direction at identical speed at a determined volume.

The construction machine can be an excavator. The construction machine can be a wheel loader.

The construction machine can comprise a hydraulic system according to the second aspect of the invention.

By the construction machine comprising the hydraulic system described herein, the energy from lowering of load, for example an excavator attachment, can be regenerated and returned, for example via a battery.

This can be achieved by the hydraulic pump which connects to the electric motor being able to run as a hydraulic motor when the load is being lowered. Thereby, energy can be regenerated. The hydraulic cylinder can preferably be a volume-neutral hydraulic cylinder which has identical volume flow in both directions. With a volume-neutral cylinder with identical oil flow in both directions of the cylinder, standard pumps can be used for this purpose.

By the excavator comprising said cylinder, a cylinder function on the excavator can be operated in a volume-neutral manner.

The construction machine can comprise a hydraulic system according to the second aspect of the invention.

By the excavator comprising a hydraulic system with a closed circuit with a volume-neutral cylinder connected to a pump which is connected to an electric motor which is operated via a frequency converter, the closed circuit can regenerate energy when a great load is applied to the cylinder. For example, oil from a boom cylinder can be pressed into the pump, so that the pump functions as a motor that drives the electric motor which generates electricity to a battery on the excavator.

In a sixth aspect, the invention relates to a procedure for operation of a cylinder according to the first, second or third aspect of the cylinder, wherein the procedure comprises the step of pumping a fluid to the cylinder.

The procedure can further comprise the step of giving a control signal to a frequency converter which is connected to an electric motor which is connected to a pump which is connected to the cylinder, so that the electric motor and the pump rotate in a desired direction and at a desired speed so as to thereby lead oil from the pump to the cylinder.

The procedure can further comprise the step of generating electric energy by allowing the cylinder to, when loaded, guide oil into the pump so that the electric motor which is connected to the pump, is subjected to a rotation and thereby generates energy.

In a seventh aspect the invention can be embodied in the following ways:

- Device for a driveline for power transfer from a battery to a number of hydraulic cylinders in a building and construction machine, wherein the electric motor is RPM regulated by means of a frequency converter and connected to a hydraulic pump which generates hydraulic pressure and flow for activation of a cylinder which is controlled directionally by means of the valve controlled by PLS assigned control unit with an operation handle.
- Device for a driveline for power transfer from a battery to a number of hydraulic cylinders in an excavator, characterised in that volume-neutral cylinders are arranged on the excavator, wherein the piston areas fulfil the relation $A1=A2+A3-A4$.
- Device as described in the seventh aspect, first paragraph, wherein counterbalance valves are connected to each of the cylinders.
- Device as described in the seventh aspect, first and/or second paragraph, wherein a number of motors and pump modules are placed on a frame construction together with a hydraulic tank and frequency converters.

BRIEF DESCRIPTION OF THE DRAWINGS

Hereunder are described examples of embodiments with reference to the attached drawings, wherein.

DETAILED DESCRIPTION OF THE DRAWINGS

In the figures, the same reference is used for elements with identical technical function. Attention is drawn to the fact that the FIGS. 1*a-c*, 2*a-c* and 3*a-c* are simplified principle drawings, and that details may have been left out on these and other figures to better emphasise the invention itself and its principle of operation.

In the FIGS. 1*a*-3*e*, three embodiments 1A, 1B, 1C are described for a cylinder according to the first aspect of the invention, wherein the cylinder 1A, 1B, 1C comprises a cylinder part and a piston part and is configured in a volume-neutral manner, which is known as volume-neutral cylinder in technical terminology.

A volume-neutral cylinder can be distinguished in that the total area of all pressure surfaces TF is identical to the total area of all opposing return pressure surfaces RTF. This applies if all the pressure surfaces and the return pressure surfaces in their entirety are located in parallel planes perpendicular to the axial movement of direction of the cylinder part relative to the piston part. Thereby, when the pressure compartment TR is supplied with a given amount of fluid through a pressure port 235, a corresponding amount of fluid can be drained through a return port 335, vice versa, so that the piston part 300 can be displaced an equal distance in a stroke direction A as in a stroke direction B, regardless of whether the given amount of fluid is supplied to the pressure compartment TR or a return pressure compartment RTR. The fluid can be oil.

All three cylinders 1A, 1B, 1C comprise a cylinder part 200 and a piston part 300 which are axially mutually displaceable relative to each other. The piston part 200 is not through. Thereby the cylinders can be end mounted 1A, 1B, 1C. End mounting can be understood as the cylinder part 200 and the piston part 300 being mountable in their respective ends, so that the distance between the cylinder fittings and the total length of the cylinder can be regulated by displacing the piston part 200 relative to the cylinder part 300.

Figure 1A:
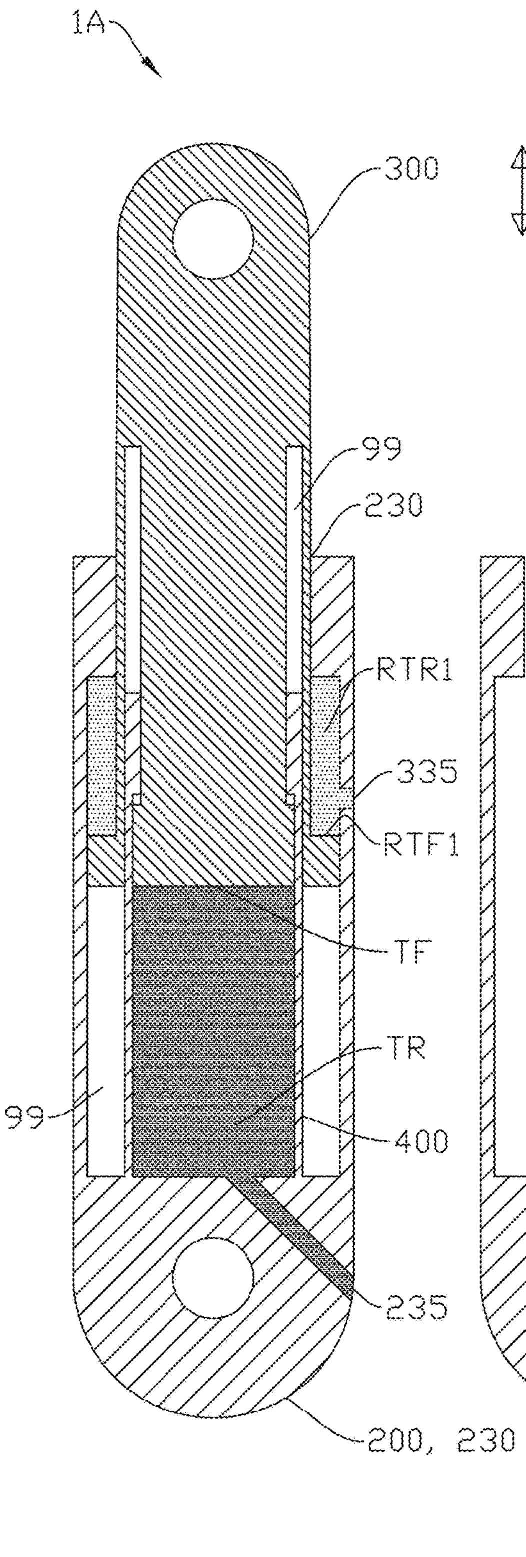
FIG. 1*a* shows a simplified principle drawing of a first embodiment of a volume-neutral cylinder.
Figure 1B:
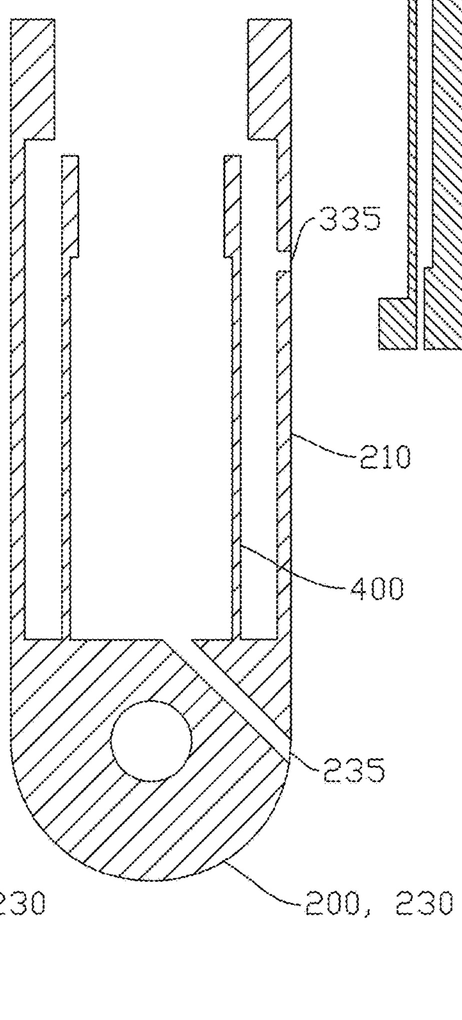
FIG. 1*b* shows a simplified principle drawing of the cylinder part belonging to the cylinder in FIG. 1*a;*
Figure 1C:
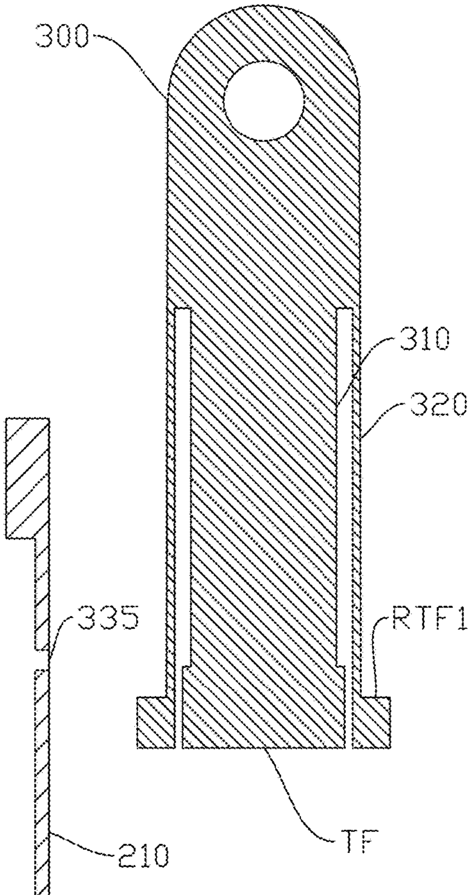
FIG. 1*c* shows a simplified principle drawing of the piston part belonging to the cylinder in FIG. 1*a;*
Figure 1D:
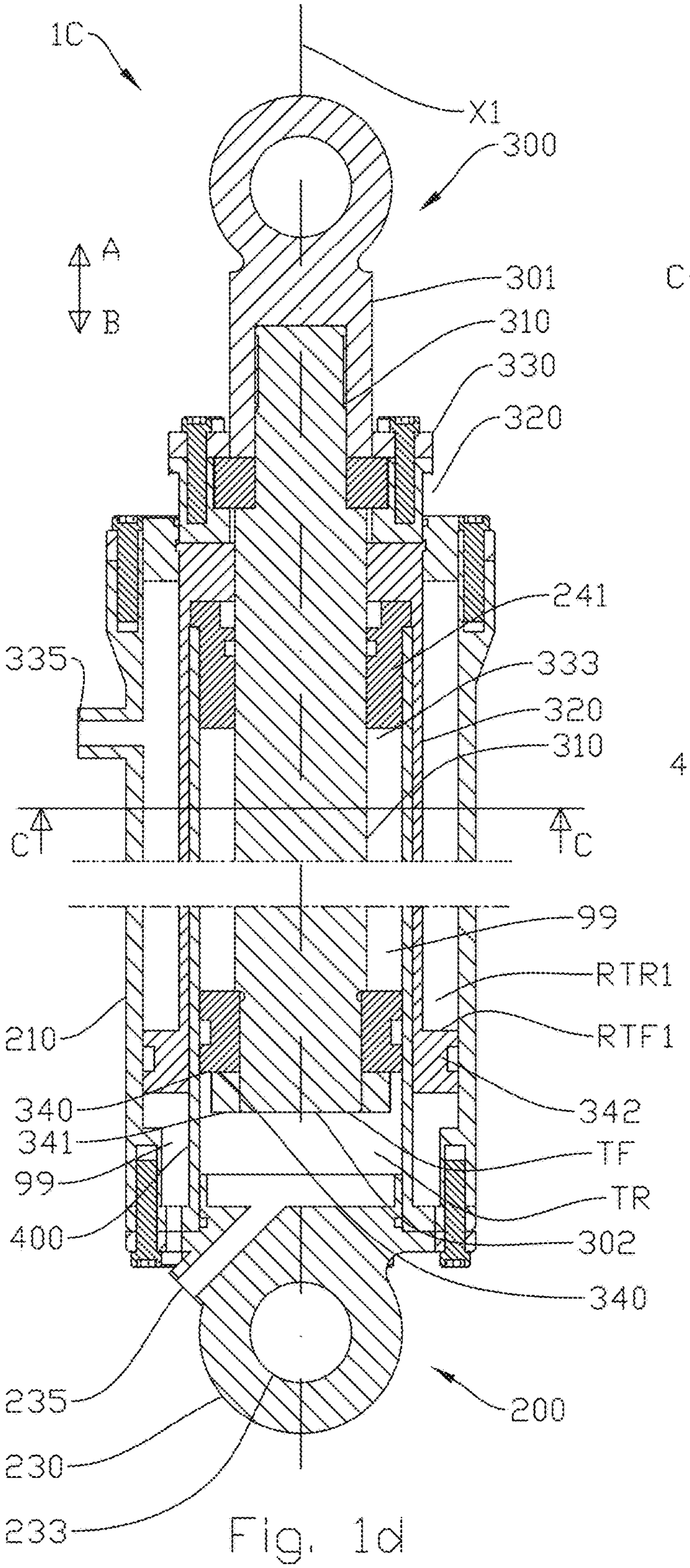
FIG. 1*d* shows a detailed axial section of the cylinder in FIG. 1*a;*
Figure 1E:
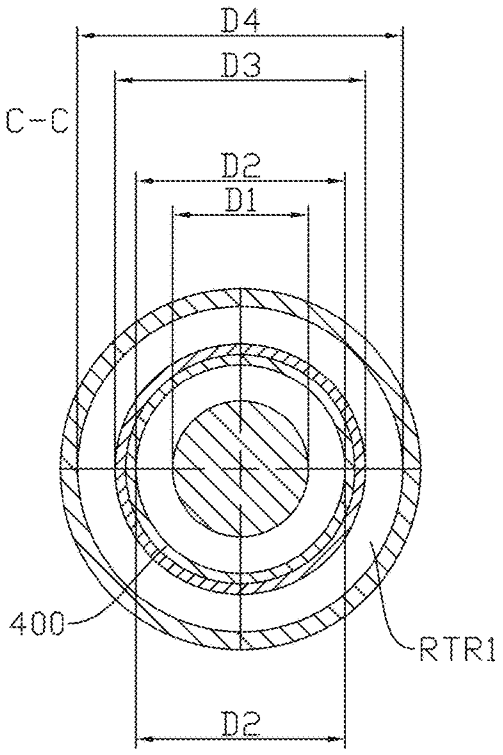
FIG. 1*e* shows a radial section of the cylinder in FIG. 1*d;*

Reference is made firstly to the first embodiment 1A, wherein the FIGS. 1*a*, 1*b* and 1*c* show simplified principle drawings of the cylinder 1A, the cylinder part 200 and the piston part 300. FIG. 1*d* shows a detailed axial section of the cylinder 1A and FIG. 1*e* shows a radial section A-A of the cylinder 1A.

The cylinder 1A comprises a piston part 300, a cylinder part 200 which on one end comprises a guide 230 for the piston part 300, and which on an opposite second end comprises a cylinder fitting 230. A pipe section 400 is connected to the cylinder part 200, wherein a portion of the pipe section 400 encloses a pressure compartment TR which in an axial direction is delimited by at least one pressure surface TF. The pressure compartment TR is arranged to receive a fluid for applying a pressure on the at least one pressure surface TF so that the piston part 300 is displaced in the first stroke direction A.

A first return pressure compartment RTR1 arranged to receive a fluid for applying a pressure on at least one first return pressure surface RTF1 so that the piston part 300 is displaced in the second return stroke direction B. The first return pressure compartment RTR1 is positioned on the outside of the pipe section 400 and is annular. The area of the at least one first return pressure surface RTF1 is identical to the area of the at least one return pressure surface TF so that a volume-neutral operation of the cylinder is provided.

In FIG. 1*d*, the pressure surface TF is shown centred and distributed between several planes formed by a piston rod 310, a locking element 341 and a piston 340.

The cylinder 1A further comprises a plurality of cavities 99, which in FIGS. 1*a* and 1*d* are closed, so that the air pressure in the cavities 99 changes with the position of the piston part. In an embodiment that is not shown, the cavities 99 can be ventilated so that the pressure in the cavities 99 is the same as the atmospheric pressure.

A rear coupling element 230 connects the pipe section 400 and an outer cylinder house 210. The rear coupling element 230 can comprise the pressure port 235 and a bolt hole 233, as shown in the FIGS. 1*a*-1*d*. Said elements are shown connected by a plurality of screws. In an alternative embodiment (not shown), two or more of the said elements can be connected to each other by a thread connection.

Further, the cylinder part 200 comprises a cylinder piston 241 which is fixed to the pipe section 400 and which forms an interior guide for the piston rod 310. A return port 335 is positioned in the outer cylinder house 210.

A front connection portion 330 connects the piston rod 310 and the piston pipe 320. On the end of the piston rod, a piston 340 with an associated locking element 341 is mounted. A first ring piston 342 is connected to the piston pipe 320 and abuts in a guiding manner the inside of the outer cylinder house 210 and the outside of the pipe section 400.

Figure 2A:
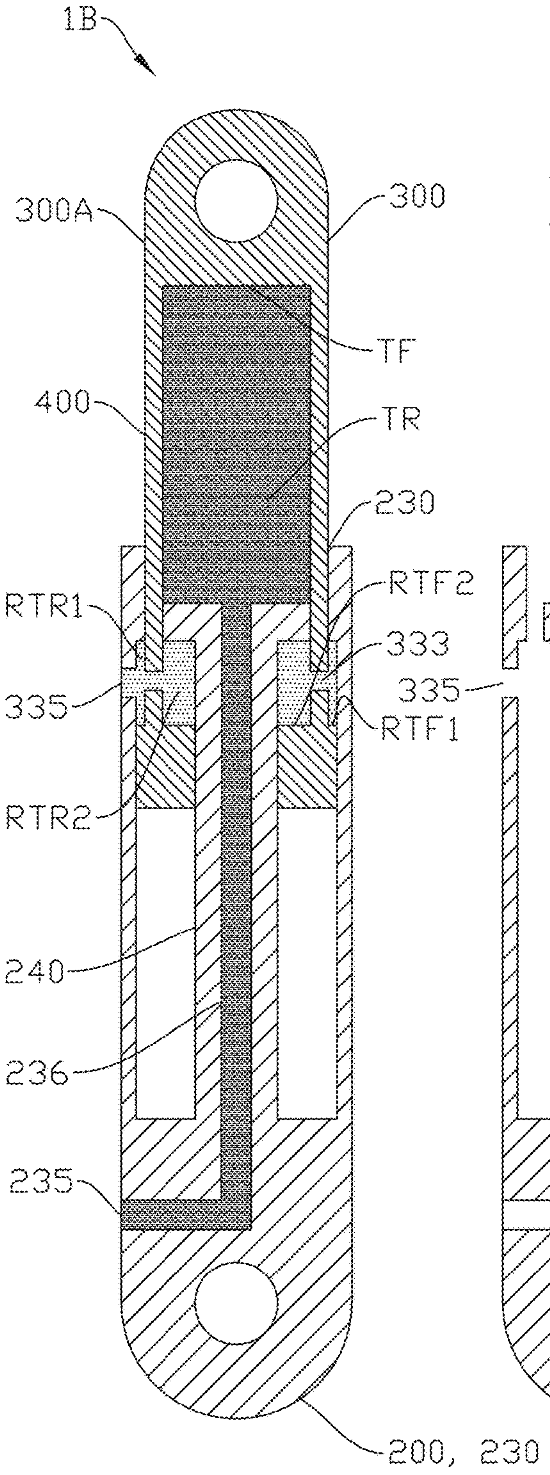
FIG. 2*a* shows a simplified principle drawing of a second embodiment of a volume-neutral cylinder.
Figure 2B:
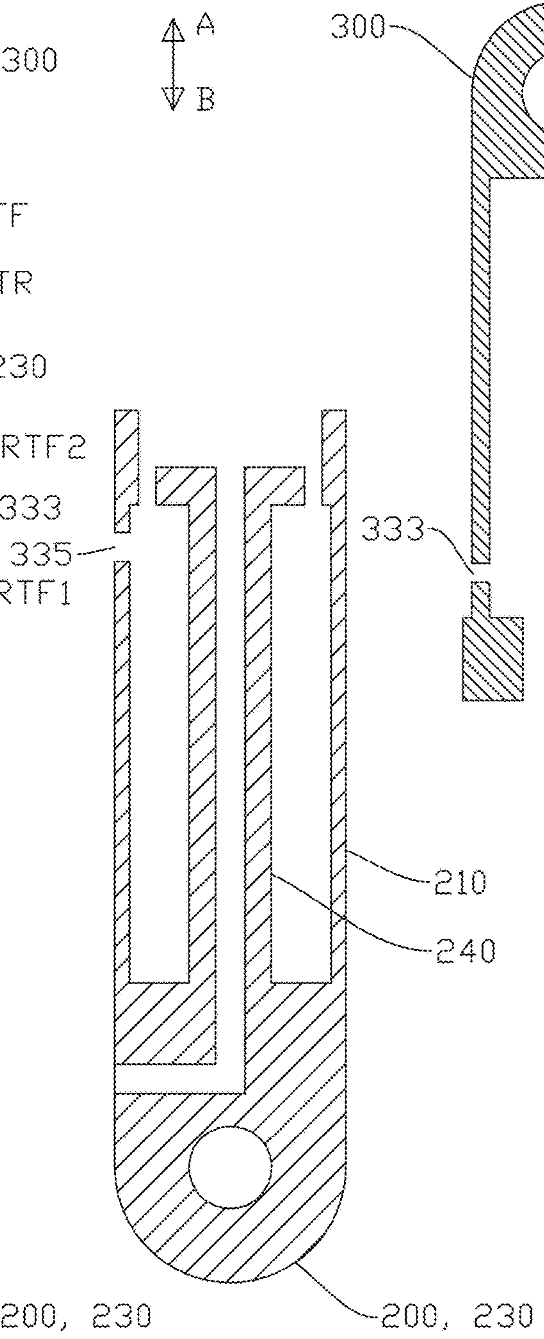
FIG. 2*b* shows a simplified principle drawing of the cylinder part belonging to the cylinder in FIG. 2*a;*
Figure 2C:
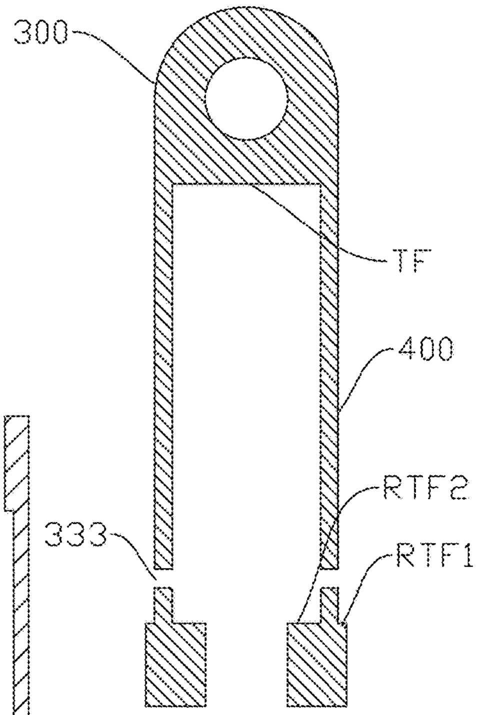
FIG. 2*c* shows a simplified principle drawing of the piston part belonging to the cylinder in FIG. 2*a;*
Figure 2D:
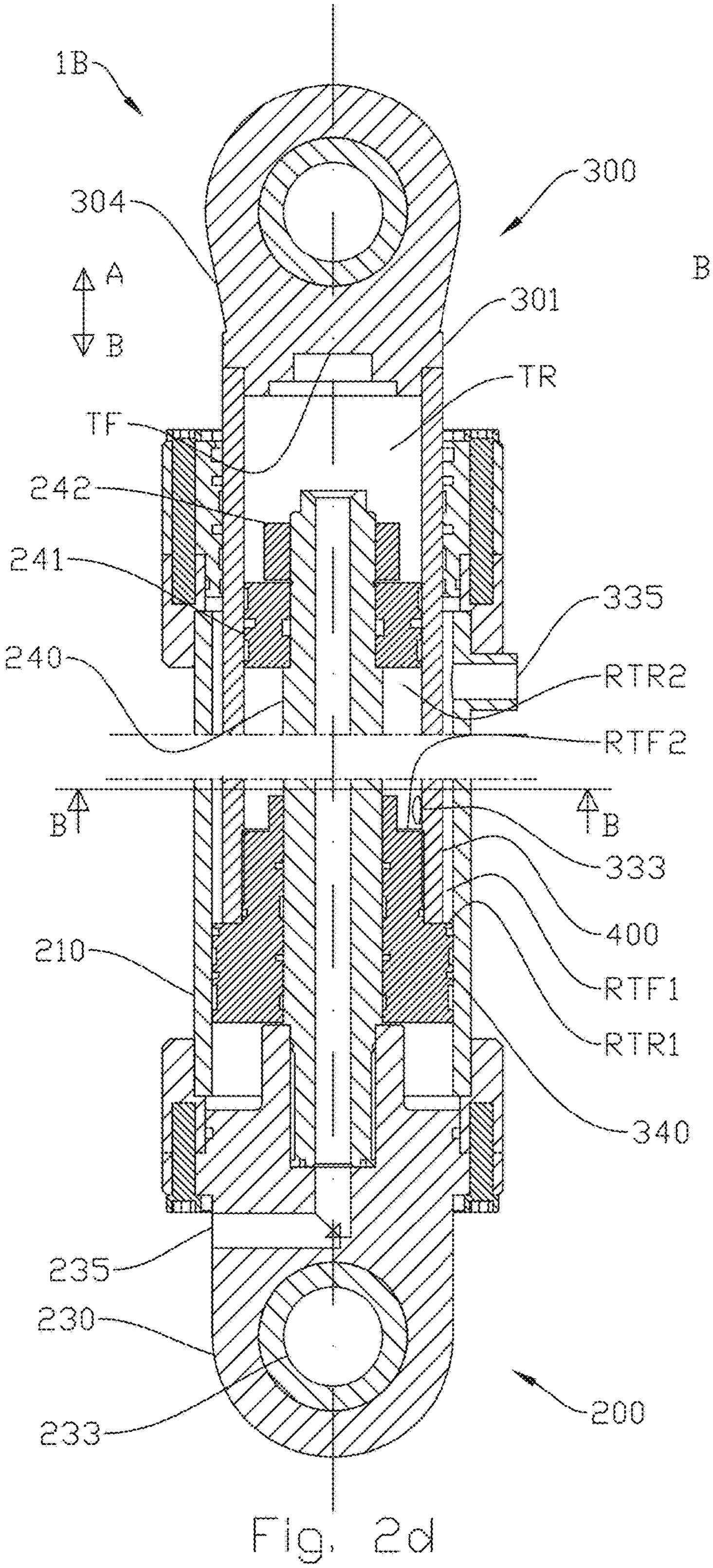
FIG. 2*d* shows a detailed axial section of the cylinder in FIG. 2*a;*
Figure 2E:
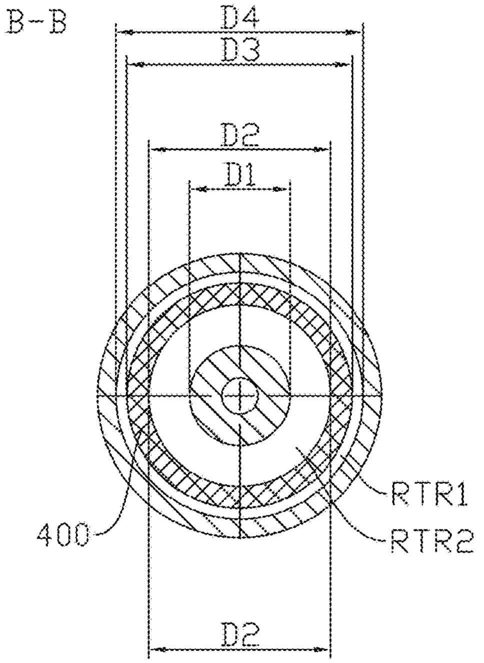
FIG. 2*e* shows a radial section of the cylinder in FIG. 2*a;*

Reference is then made to the second embodiment 2B, wherein the FIGS. 2*a*, 2*b* and 2*c* show simplified principle drawings of the cylinder 2B and the cylinder part 200 and the piston part 300. FIG. 2*e* shows a detailed axial section of the cylinder and FIG. 2*e* shows a radial section B-B of the cylinder.

In the second embodiment 1B, the pipe section 400 is connected to the piston part 300. The pipe section 400 functionally replaces the piston rod 330 in the first and the third embodiment 1A, 1C.

The pressure compartment TR and the associated pressure surface TF are positioned in the piston part's first end 300A.

The first return pressure compartment RTR1 is supplied with a second return pressure compartment TRF2 and a second return pressure surface TRF2 positioned on the inside of the pipe section 400 and on the outside of a cylinder pipe 240 associated with the cylinder part. The cylinder pipe 240 comprises an axial fluid channel 236.

When the piston part 300 is to be guided in the first stroke direction A, the fluid is supplied via the pressure port 235 and the fluid channel 236 so that a fluid pressure is provided on the pressure surface TF. When the piston part 300 is to be guided in the second stroke direction B, the fluid is supplied through the return pressure port 335. The pipe section 400 comprises at least one port 333 so that the fluid being led in and out through the return pressure port 335 can flow between the first return pressure compartment RTR1 and the second return pressure compartment RTR2. Thereby an identical fluid pressure can be provided in the first return pressure compartment RTR1 and the second return pressure compartment RTR2.

The area of the first return pressure surface RTF1 and the second return pressure surface RTF2 is identical to the area of the pressure surface TF.

Figures 3A, 3B, 3C:
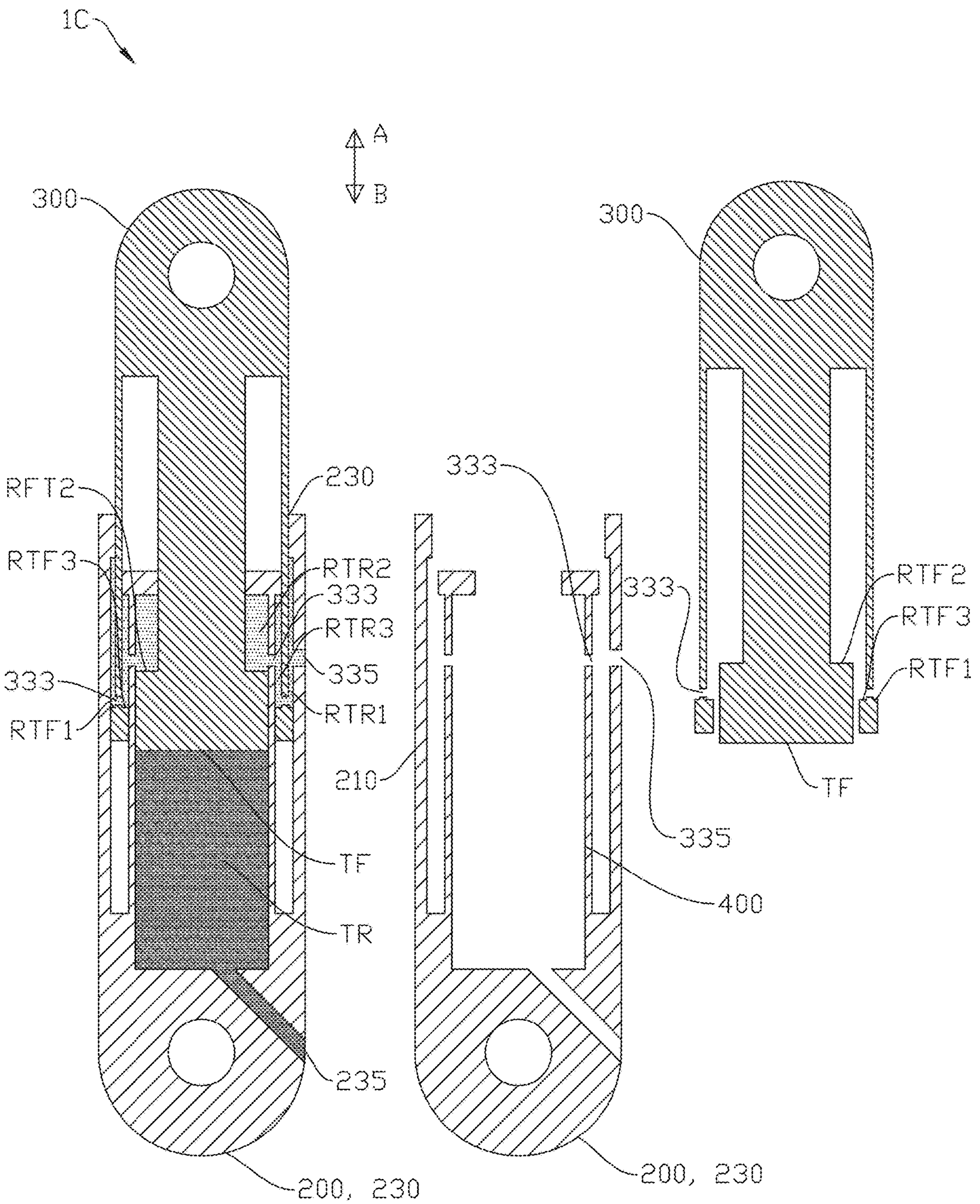
FIG. 3*a* shows a simplified principle drawing of a third embodiment of a volume-neutral cylinder.
FIG. 3*b* shows a simplified principle drawing of the cylinder part belonging to the cylinder in FIG. 3*a;*
FIG. 3*c* shows a simplified principle drawing of the piston part belonging to the cylinder in FIG. 3*a;*
Figure 3D:
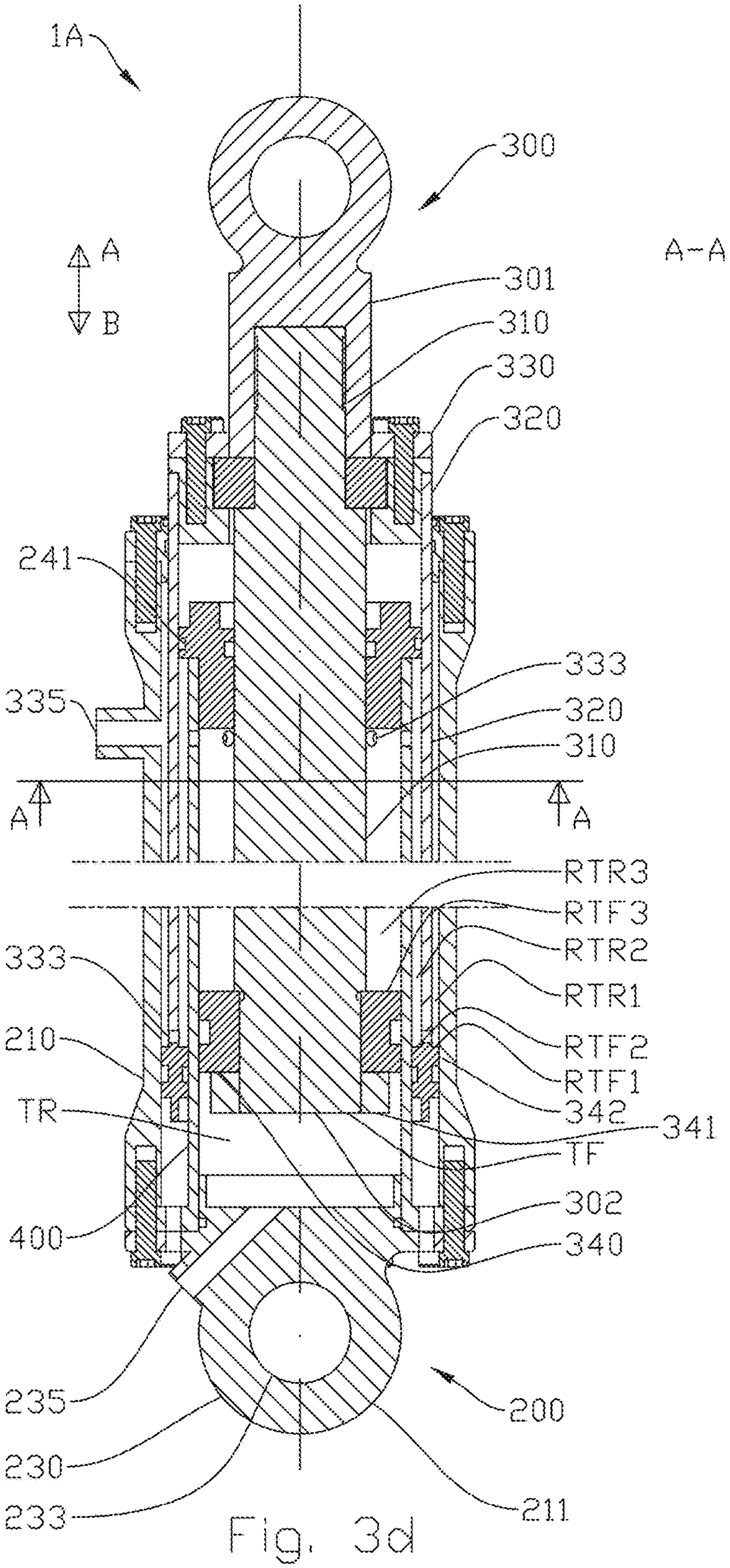
FIG. 3*d* shows a detailed axial section of the cylinder in FIG. 3*a;*
Figure 3E:
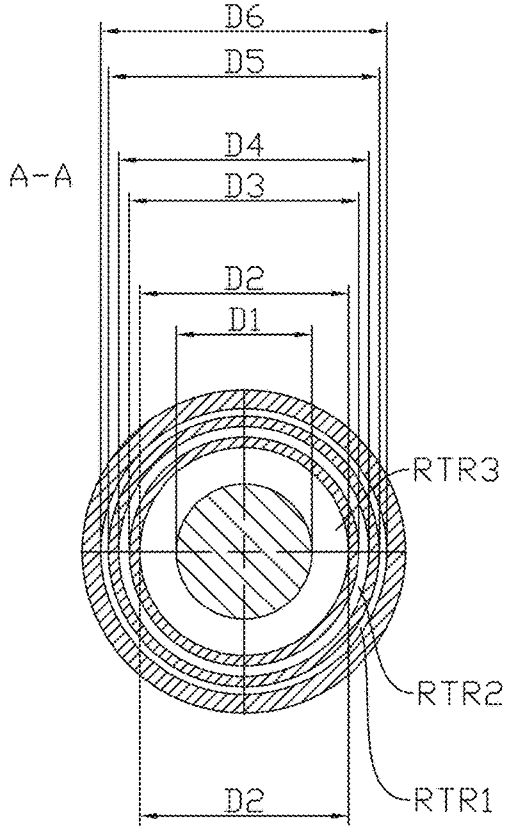
FIG. 3*e* shows a radial section of the cylinder in FIG. 3*a;*

Reference is then made to the third embodiment 3B, wherein the FIGS. 3*a*, 3*b* and 3*c* show simplified principle drawings of the cylinder 3B and the cylinder part 200 and the piston part 300. FIG. 3*e* shows a detailed axial section of the cylinder and FIG. 3*e* shows a radial section C-C of the cylinder.

In the third embodiment 1C, the pipe section 400 is connected to the cylinder part 200, corresponding to the first embodiment 1A. The first return pressure compartment RTR1 and the second return pressure compartment RTR2 is supplied with a third return pressure compartment RTR3 with a third return pressure surface TRF3. The third return pressure compartment RTR3 is positioned on the outside of the pipe section 400 and on the inside of a piston pipe 320 which is positioned between the pipe section 400 and the cylinder pipe 210. The piston pipe 320 belongs to the piston part 300. The piston pipe 320 and the pipe section 400 comprise a plurality of ports 333 so that the fluid can flow between the first return pressure compartment RTR1, the second return pressure compartment RTR2 and the third return pressure compartment RTR3. Thereby an identical fluid pressure can be provided in the first return pressure compartment RTR1, the second return pressure compartment RTR2 and the third return pressure compartment.

The area of the first return pressure surface RTF1, the second return pressure surface RTF2 and the third return pressure surface RTF2 is identical to the area of the pressure surface TF.

The pressure areas and return pressure areas can be calculated. For the third embodiment 1C, for example the below formula may be used, wherein A2 is the area of the pressure surface TF and A1, A3 and A4 are the areas of the return pressure surfaces RTF1, RTF2 and RTF3.

$$A2=A1+A3-A4$$

$$A1=3.14/4(D2-D1^2)$$

$$A2=3.14/4(D2^2)$$

$$A3=3.14/4(D6^2-D3^2)$$

$$A4=3.14/4(D5^2-D4^2)$$

The volume-neutral cylinder 1A, 1B, 1C described herein substantially provides the same build-in measurements and stroke as a regular double acting cylinder with end mounting, because the cylinder does not have a through piston rod. The volume-neutral configuration is different from a volume-neutral cylinder according to prior art by the pressure compartment TR being centred and the corresponding return pressure compartment RTR being partially or fully arranged radially externally to the pressure compartment TR. This facilitates use of volume-neutral cylinders where end mounting is required and where there is limited space.

In an alternative embodiment which is not shown, the cylinder part 200 may have side attachment wherein two radially opposing cylinder fittings are arranged on the radial surface of the cylinder pipe. Such an attachment is known to be used on tipping cylinders for lorries and trailers.

In a further embodiment which is not shown, the cylinder part can be fastened to a foundation so that the cylinder part 200 provides a fixed position for the foundation.

Figure 4B:
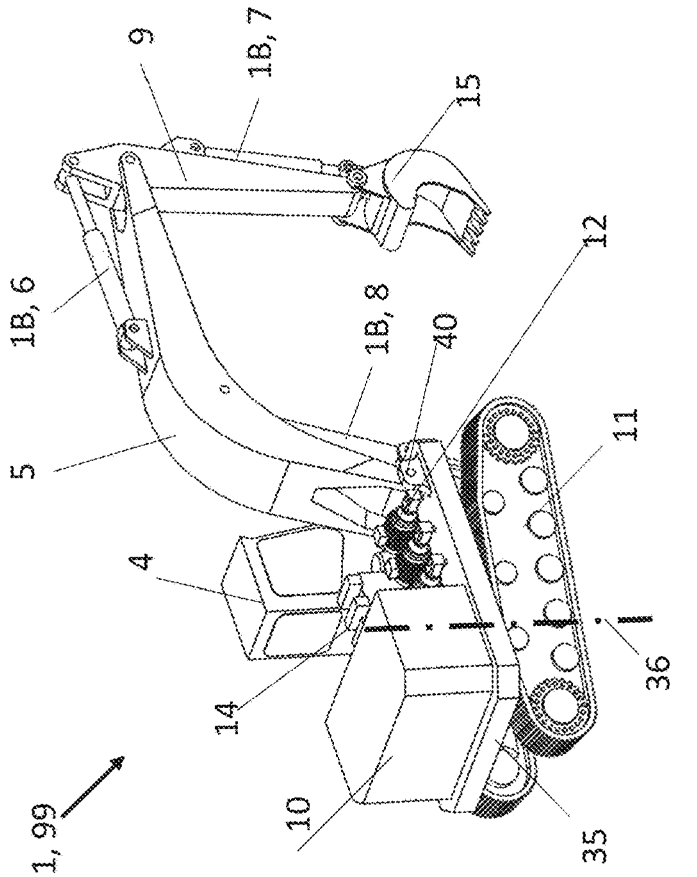
FIG. 4*b* shows the excavator of FIG. 4*a* in a perspective view.
Figure 4A:
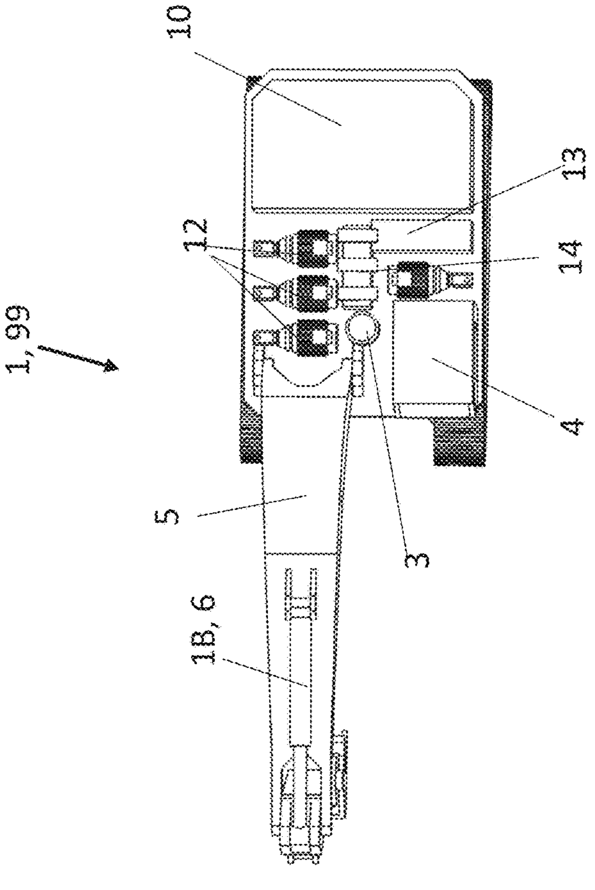
FIG. 4*a* shows a top sketch of an excavator with an electro-hydraulic system comprising a volume-neutral cylinder.

The FIGS. 4*a* and 4*b* show an excavator 90 comprising an electro-hydraulic system 99 according to the second aspect of the invention and three volume-neutral cylinders 1B on the FIGS. 4*a* and 4*b* indicated by the reference numbers 6, 7 and 8. The cylinders 8, 6, 7 are end mounted, as is common on excavators.

The excavator 90 comprises a transportation device 11 with belts for movement of the excavator 90. On top of the transportation device 11, a frame construction 35 is arranged rotatably about an axis 36. On the frame construction 35, batteries 10 and fittings 40 are mounted for fitting of a digging boom 5. A boom cylinder 8 operates the digging boom 5. A stick cylinder 6 operates a dipper stick 9, and a bucket cylinder 7 operates a digging bucket 15.

Additionally, on the frame construction 35, a number of electro-hydraulic aggregates 12 are mounted, each with an electric motor 16, a pump 18 and a frequency converter 13. In addition, the electro-hydraulic system 99 comprises an oil tank 17 and a swivelling motor 3 which provides rotation about the axis 36.

An operator cab 4 contains operation handles 25 with a control unit 24 for operation of cylinder functions for the cylinders 6, 7 and 8.

To minimise the energy loss between the battery 10 and work performed with a digging bucket 15, the oil flow 30 to each of the cylinders 6, 7 and 8 is operated by individual pumps 18 driven by electric motors 16 which are RPM regulated by frequency converters 13 connected to the battery 10 through the connection 19.

Figure 5:
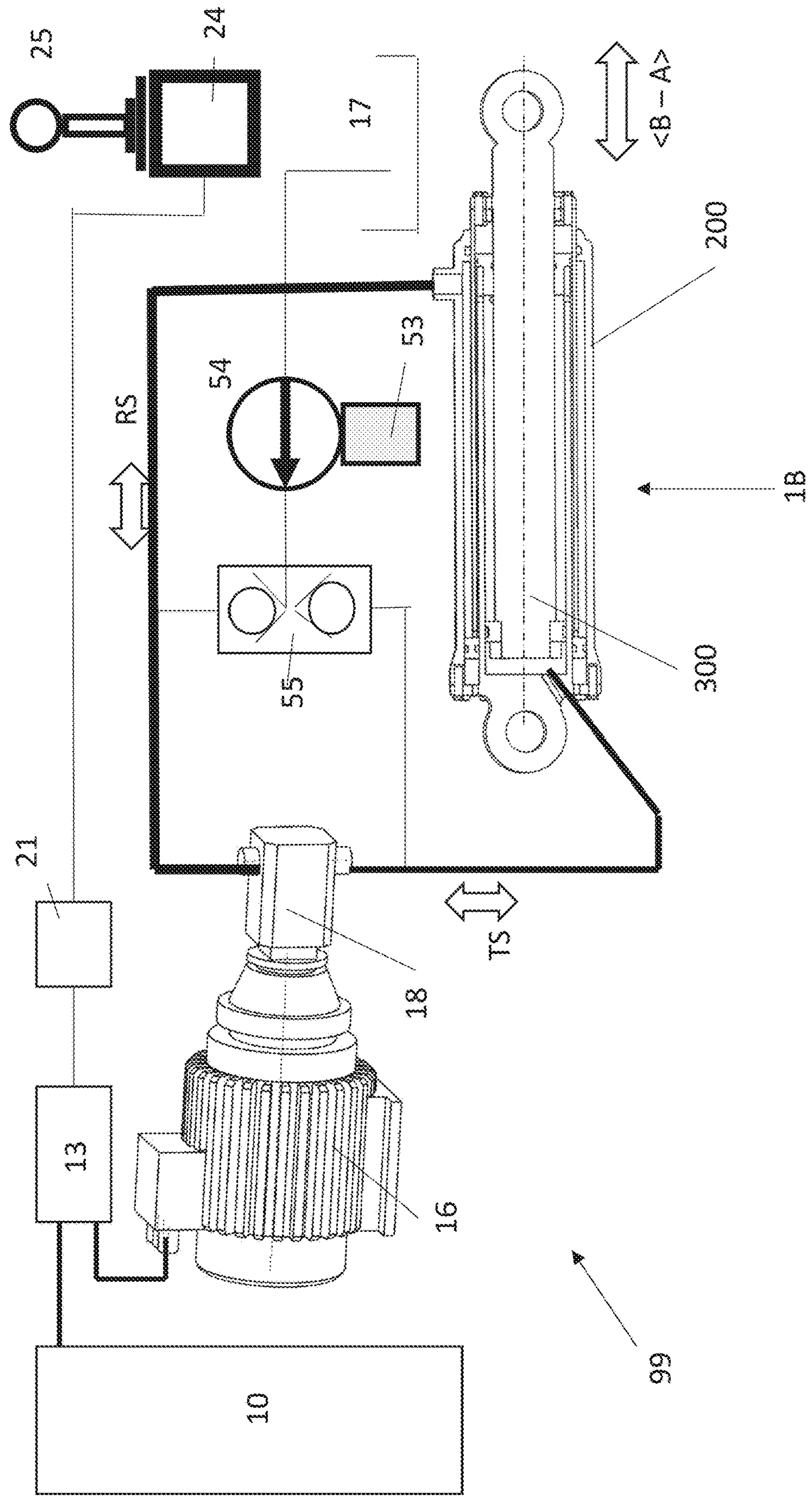
FIG. 5 shows a schematic diagram for an electro-hydraulic system comprising a volume-neutral cylinder.

FIG. 5 shows a schematic diagram for the electro-hydraulic system 99 in the FIGS. 4*a* and 4*b*. The cylinder 1*b* in FIG. 5 corresponds to one of the cylinders 6, 7, 8 in the FIGS. 4*a* and 4*b*.

The electric motor 16 drives the hydraulic pump 18 which generates a hydraulic pressure and an oil flow for activation of the cylinder 3B. A frequency converter 13 regulates the RPM and rotation direction of the electric motor 16. Thereby the stroke direction of the cylinder 1*b* can be regulated directly from the electric motor 16 without the use of directional control valves.

Because the cylinder 1B is volume neutral, the oil flow in the cylinder's pressure compartment TR and the return pressure compartment RTR (see FIGS. 3*a* and 3*d*) is identical. When the digging boom 5 in FIGS. 4*a* and 4*b* is to be raised, an oil flow and an oil pressure is supplied to the pressure compartment TR, and the piston part 300 is displaced out of the cylinder house 200.

When the digging boom 5 is lowered, energy can be regenerated by fluid flowing through the pump 18 so that it functions as a motor. As the pump 18 is connected to the electric motor 16, the electric motor 16 will function as a generator which generates energy to the battery 10 through the frequency converter 13. A corresponding regeneration can occur for the stick cylinder 6 and the bucket cylinder 7.

The electro-hydraulic system 99 further comprises a separate circuit for top-up of oil due to any internal leaks in the hydraulic circuit. Top-up is done by a pump 54 connected to a tank 17 leading oil to the pressure side TS and the return side TR through a check valve 55. The check valve shown in FIG. 5 is dual, so that the oil can be supplied to both the pressure side TS and the return side TR.

Figure 6:
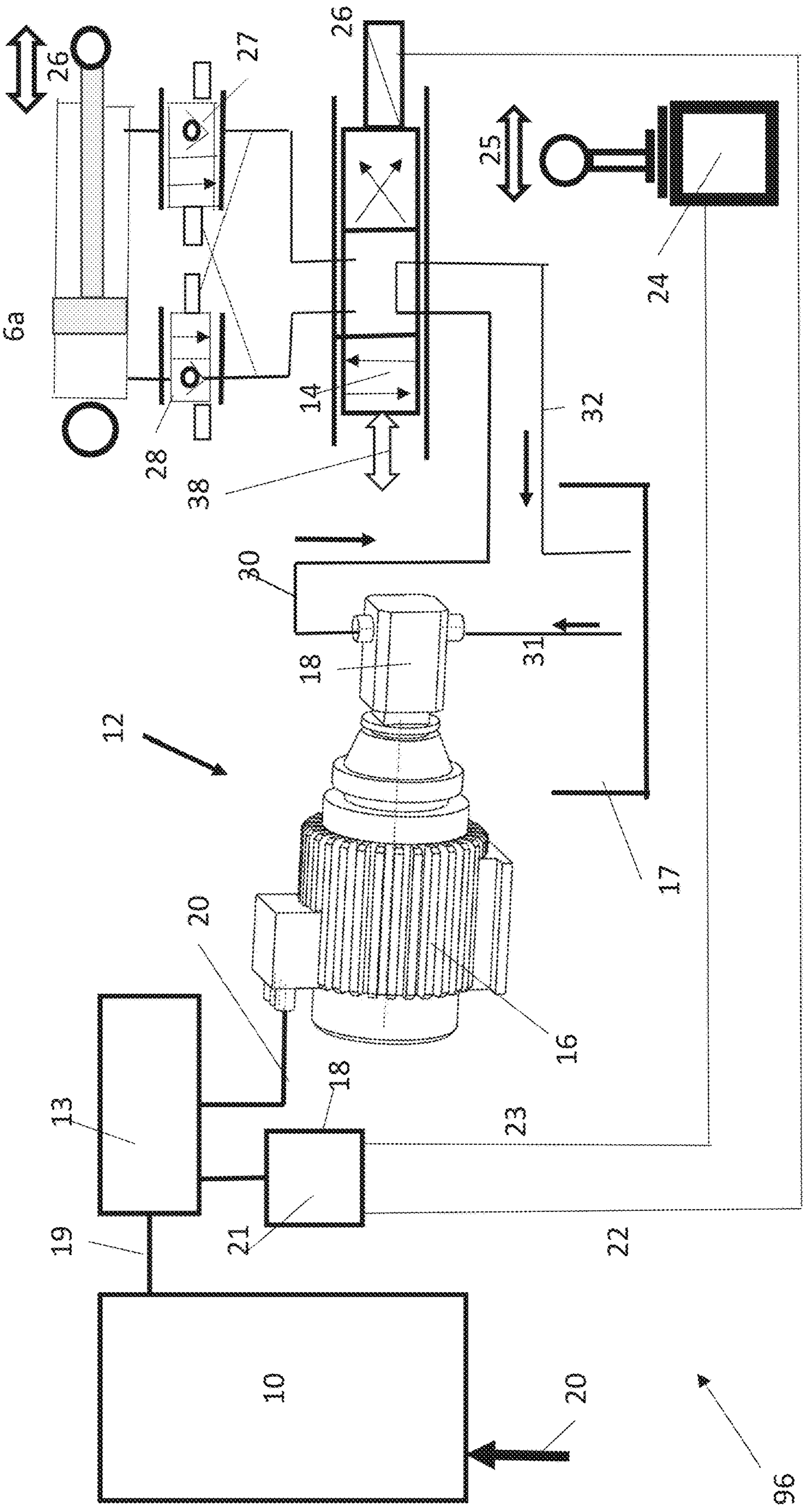
FIG. 6 shows the electro-hydraulic system comprising a double acting cylinder according to prior art.

FIG. 6 shows an alternative hydraulic system 96, wherein the volume-neutral cylinder 1B is replaced with another double-acting cylinder 6*a* which is not volume neutral. Because the cylinder 6*a* has a different area on the pressure side TS than the return side TR, a different amount of oil will be supplied and drained when the piston part 300 is lead out of or into the cylinder house 200.

In FIG. 6, the electric motor 16 rotates in only one direction, and the stroke direction of the cylinder 6*a* is therefore regulated with a directional control valve 14, controlled by a PLS 21, assigned to the control unit 24 and the operation handle 25. Further, two counterbalance valves 27, 28 are shown.

It should be noted that all embodiments mentioned above illustrate the invention, but do not delimit it, and experts on the area will be able to design many alternative embodiments without deviating from the scope of the attached claims. In the claims, the reference numbers in parenthesis shall not be considered delimiting.

The use of the verb "to comprise" and its different forms does not exclude the presence of elements or steps not mentioned in the claims. The indefinite articles "a" or "an" before an element do not exclude the presence of more such elements.

The fact that some features are specified in mutually different dependent claims does not indicate that a combination of these features cannot be used advantageously.

What is claimed is:

1. A cylinder comprising:

a piston part;

a cylinder part arranged for axial movement relative to the piston part, the piston part and/or the cylinder part comprising a pipe section;

one or more pressure compartments arranged to receive a fluid to apply a pressure on one or more pressure surfaces for displacement of the piston part axially in a first stroke direction, wherein a portion of the pipe section encloses the at least one of said pressure compartments and/or pressure surfaces in a radial inner region of the cylinder; and return pressure compartments arranged to receive a fluid to apply a pressure on return pressure surfaces for displacement of the piston part axially in a second, return stroke direction which is opposite to the stroke direction, the return pressure compartments comprising at least one first return pressure compartment and at least one second return pressure compartment, wherein the at least one first return pressure compartment and/or at least one first return pressure surface is defined in a radial outer region of the cylinder;

wherein the pipe section further encloses said at least one second return pressure compartment and/or at least one second return pressure surface;

wherein the pipe section permits fluid communication between the first return pressure compartment and the second return pressure compartment;

wherein the one or more pressure compartments and the return pressure compartments are configured for volume neutral operation of the cylinder, the return pressure surfaces having in total an area, when projected onto a plane perpendicular to the axial direction, which is equal to the total area of the one or more pressure surfaces.

2. The cylinder according to claim 1, wherein the pipe section comprises at least one port arranged to provide fluid communication between the first return pressure compartment and the second return pressure compartment.

3. The cylinder according to claim 1, wherein the at least one first return pressure compartment and/or return pressure surfaces in the radial outer area of the cylinder is positioned on the outside of the pipe section.

4. The cylinder according to claim 1, wherein the cylinder part or the piston part has a first end which comprises a guide for the other of the cylinder part and the piston part and an opposite, second end which is closed for the other of the cylinder part and the piston part.

5. The cylinder according to claim 1, further comprising at least one third return pressure compartment and/or at least one third return pressure surface.

6. A cylinder comprising:

a piston part;

a cylinder part arranged for axial movement relative to the piston part, the piston part and/or the cylinder part comprising a pipe section;

one or more pressure compartments arranged to receive a fluid to apply a pressure on one or more pressure surfaces for displacement of the piston part in a first stroke direction, wherein a portion of the pipe section encloses the at least one of said pressure compartments and/or pressure surfaces in a radial inner region of the cylinder; and return pressure compartments arranged to receive a fluid to apply a pressure on return pressure surfaces for displacement of the piston part in a second stroke direction, the return pressure compartments comprising at least one first return pressure compartment, at least one second return pressure compartment, and at least one third return pressure compartment, wherein the at least one first return pressure compartment and/or at least one first return pressure surface is defined in a radial outer region of the cylinder, and further comprising at least one third return pressure surface;

wherein the pipe section further encloses said at least one second return pressure compartment and/or at least one second return pressure surface; and wherein the pipe section permits fluid communication between the first return pressure compartment and the second return pressure compartment; and a cylinder pipe between the first return pressure compartment and the third return pressure compartment, and the cylinder pipe comprises at least one port arranged to provide fluid communication between the first return pressure compartment and the third return pressure compartment.

7. The cylinder according to claim 6, wherein the third return pressure compartment is defined in the radial outer region of the cylinder, and the second return fluid compartment is in fluid communication with the third return fluid compartment.

8. A cylinder comprising:

a piston part;

a cylinder part which in a first end comprises a guide for the piston part and which in an opposite, second end is closed for the piston part;

one or more pressure compartments arranged to receive a fluid to apply a pressure on one or more pressure surfaces for displacement of the piston part axially in a first, stroke direction; and return pressure compartments arranged to receive a fluid to apply a pressure on return pressure surfaces for displacement of the piston part axially in a second, return stroke direction which is opposite to the stroke direction, the return pressure compartments comprising at least one first return pressure compartment and at least one second return pressure compartment arranged in fluid communication through a pipe section of the cylinder part or the piston part;

the one or more pressure compartments and the return pressure compartments being configured for volume-neutral operation of the cylinder, the return pressure surfaces having in total an area, when projected onto a plane perpendicular to the axial direction, which is equal to the total area of the one or more pressure surfaces.

9. A cylinder comprising:

a piston part;

a cylinder part arranged for axial movement relative to the piston part;

one or more pressure compartments arranged to receive a fluid to apply a pressure on one or more pressure surfaces for displacement of the piston part axially in a first, stroke direction; and return pressure compartments arranged to receive a fluid to apply a pressure on return pressure surfaces for displacement of the piston part axially in a second, return stroke direction;

a pipe section which is connected to the piston part or the cylinder part, wherein a portion of the pipe section encloses the at least one of said pressure compartments which in an axial direction is delimited by the at least one of said pressure surfaces;

the return pressure compartments comprising at least one first return pressure compartment and at least one second return pressure compartment arranged in fluid communication, at least said first return pressure compartments and/or the return pressure surfaces being positioned on the outside of the pipe section;

wherein the one or more pressure compartments and the return pressure compartments are configured for volume neutral operation of the cylinder, the return pressure surfaces having in total an area, when projected onto a plane perpendicular to the axial direction, which is equal to the total area of the one or more pressure surfaces.

10. A hydraulic system comprising a hydraulic circuit which comprises at least one cylinder according to claim 9.

11. The hydraulic system according to claim 10, wherein the hydraulic circuit is closed.

12. The hydraulic system according to claim 11, wherein the closed circuit comprises a top-up pump and an oil tank arranged to supply top-up oil to the closed circuit.

13. The hydraulic system according to claim 12, wherein the oil tank is arranged to supply the top-up oil to the circuit through at least one check valve.

14. A hydraulic system comprising:

a hydraulic circuit which comprises at least one cylinder, the cylinder comprising:

a piston part;

a cylinder part arranged for axial movement relative to the piston part;

one or more pressure compartments arranged to receive a fluid to apply a pressure on one or more pressure surfaces for displacement of the piston part in a first stroke direction;

return pressure compartments arranged to receive a fluid to apply a pressure on return pressure surfaces for displacement of the piston part in a second stroke direction; and a pipe section which is connected to the piston part or the cylinder part, wherein a portion of the pipe section encloses the at least one of said pressure compartments which in an axial direction is delimited by the at least one of said pressure surfaces;

the return pressure compartments comprising at least one first return pressure compartment and at least one second return pressure compartment arranged in fluid communication, at least said first return pressure compartments and/or the return pressure surfaces being positioned on the outside of the pipe section; and wherein the cylinder is connected to a fluid pump configured to being driven with a rotation direction which is switchable between a first rotation direction and a second rotation direction, wherein in the first rotation direction the pump operates to supply fluid to the cylinder's pressure compartment, and in the second rotation direction the pump operates to supply fluid to the cylinder's return pressure compartment.

15. The hydraulic system according to claim 14, wherein the fluid pump is connected to an electric motor, and the electric motor is connected to a frequency converter arranged to change the rotation direction and the RPM of the electric motor and/or the pump.

16. A construction machine comprising at least one cylinder according to claim 9.

17. A construction machine comprising a hydraulic system according to claim 10.

18. A method of operating a cylinder according to claim 10, wherein the procedure comprises the step of pumping a fluid to the cylinder.

19. The method according to claim 18, wherein the cylinder is connected to a fluid motor which is connected to an electric motor which is connected to a frequency converter; and the procedure further comprises the step of giving a control signal to the frequency converter so that the electric motor and the pump rotate in a desired direction and at a desired speed to thereby guide the fluid from the pump to the cylinder.

20. The method according to claim 19, wherein the procedure further comprises the step of generating electric energy by allowing the cylinder to, when loaded, guide fluid into the pump so that the electric motor which is connected to the pump is subjected to a rotation, and thereby generate energy.

* * * * *